United States Patent [19]

Johnson et al.

[11] 3,860,754

[45] Jan. 14, 1975

[54] LIGHT BEAM POSITION ENCODER APPARATUS

[75] Inventors: Roger L. Johnson, Monticello, Ill.; Frederick A. Ebeling, Dearborn, Mich.; James H. Parry, Champaign, Ill.

[73] Assignee: University of Illinois Foundation, Urbana, Ill.

[22] Filed: May 7, 1973

[21] Appl. No.: 358,020

[52] U.S. Cl. .................................. 178/18, 340/365 P
[51] Int. Cl. .............................................. G08c 21/00
[58] Field of Search ......... 340/365 P, 365 S, 365 E, 340/166 R; 250/553, 271, 221, 338, 349, 578; 178/18, 19, 17 D

[56] References Cited

UNITED STATES PATENTS

| | | | |
|---|---|---|---|
| 3,478,220 | 11/1969 | Milroy | 340/365 P |
| 3,508,079 | 4/1970 | Moll et al. | 340/365 E |
| 3,609,713 | 9/1971 | Wooton et al. | 340/365 P |

OTHER PUBLICATIONS

Betts et al., "Light Beam Matrix Input Terminal," IBM Technical Disclosure Bulletin, Vol. No. 9, No. 5, October 1966, pages 493–494.

*Primary Examiner*—Thomas A. Robinson
*Attorney, Agent, or Firm*—Merriam, Marshall, Shapiro & Klose

[57] ABSTRACT

An improved sequentially scanned crossed light beam position encoder including means for detecting and transmitting the address of interrupted light beams, means for electrically detecting the subsequent status of an initially detected interrupted beam and means for inhibiting subsequent transfer of the address of the initially detected interrupted beam in the event the subsequent beam status at the address has not changed. The improvement includes means for continuously sequentially activating pairs of non-visible radiation sources and detectors to continuously scan the surface of a display device with respective crossing beams, and means responsive to the initial detection of an interrupted beam at an associated address and responsive to the subsequent absence of beam interruption at the same address on a subsequent scan to reset the system and prepare it for further detection of new beam interruptions.

9 Claims, 3 Drawing Figures

LIGHT BEAM POSITION ENCODER APPARATUS

This invention relates to position encoder apparatus and in particular to light beam position encoders for display devices.

Reference may be made to the following: F.A. Ebeling, R.S. Goldhor, and R.L. Johnson, "A Scanned Infrared Light Beam Touch Entry System," *SID Symposium Digest of Papers*, June 6, 7, 8, 1972, pages 134–135; D.L. Richardson, "XY Coordinate Detection Using A Passive Stylus In An Infrared Diode Matrix," *SID Symposium Digest of Papers*, June 6, 7, 8, 1972, Pages 132–133; and P. Betts, "Light Beam Matrix Input Terminal," *IBM Technical Disclosure Bulletin*, Vol. 9, No. 5, October, 1966, pages 493–494.

The above referenced Ebeling et al. article refers to an improved touch entry device for computer displays which offers significant advantages over prior art attempts. In particular, the device utilizes paired light beam sources and detectors in a crossed light beam grid with each source-detector pair being sequentially strobed. Since only one detector is looking at its associated paired light source, the necessity for beam collimation of earlier crossed light beam systems has been eliminated. A complete description of such an improved position encoder for display devices is presented in a copending application of Ebeling et al., "Infrared Light Beam XY Position Encoder For Display Devices" U.S. Ser. No. 229,870, filed Feb. 28, 1972, now U.S. Pat. No. 3,775,560, issued Nov. 27, 1973 assigned to the same assignee as the present application, and the disclosure of which is incorporated herein by reference. In the device described in the aforementioned application, the array of source/detector pairs providing crossed light beams is electronically strobed or scanned with a cycle time that is compatible with the human reaction times involved. Upon detection of beams interrupted by an obstacle, such as a finger, the associated address is transferred to a computer. Thus, the device must electronically scan fast enough so as to detect an operation where one very quickly touches and then removes his finger. On the other hand, it is desirable to avoid repeated transmission of an identical address where one is merely holding his finger for a prolonged time on the same position on the display surface. The last mentioned problem is of particular importance where the position encoder is utilized with a terminal display in a multiterminal computer based information communication system. It is desired of course to minimize the amount of information needed to be transmitted between each of the terminal display stations and the computer. Thus, the position encoder should be fast enough to detect quick touches, and yet must avoid the undesired transmission of redundant address information.

The terms "crossed light beam," "crossed beams," "crossing beams" and the like, herein refer both to an arrangement wherein one set of paired sources and detectors is in the same plane as another set of paired sources and detectors so that the respective beams may physically intersect; or wherein two or more sets of paired sources and detectors are in different planes so that the respective beams may not physically intersect.

SUMMARY OF THE INVENTION

An improved position encoder in accordance with the present invention avoids the transmission of redundant address information by comparing beam status information obtained during sequential scanning cycles subsequent to an initial detection. If an interrupted beam is again detected at the old address, the information is not again transmitted to the computer. If upon detection of an uninterrupted beam at a subsequent scan at the old address, the system is reset and searches for a new address.

An improved sequentially scanned light beam position encoder in accordance with the invention includes means for detecting and transmitting the address of an interrupted beam, means for electrically detecting the subsequent status of an initially detected interrupted beam and means for inhibiting subsequent transfer of the address of the initially detected interrupted beam in the event the subsequent beam status at the address has not changed. The improvement includes means responsive to the subsequent absence of beam interruption at the same address on a subsequent scan to reset the system and prepare it to search for new beam interruptions.

DETAILED DESCRIPTION

Figure 1:
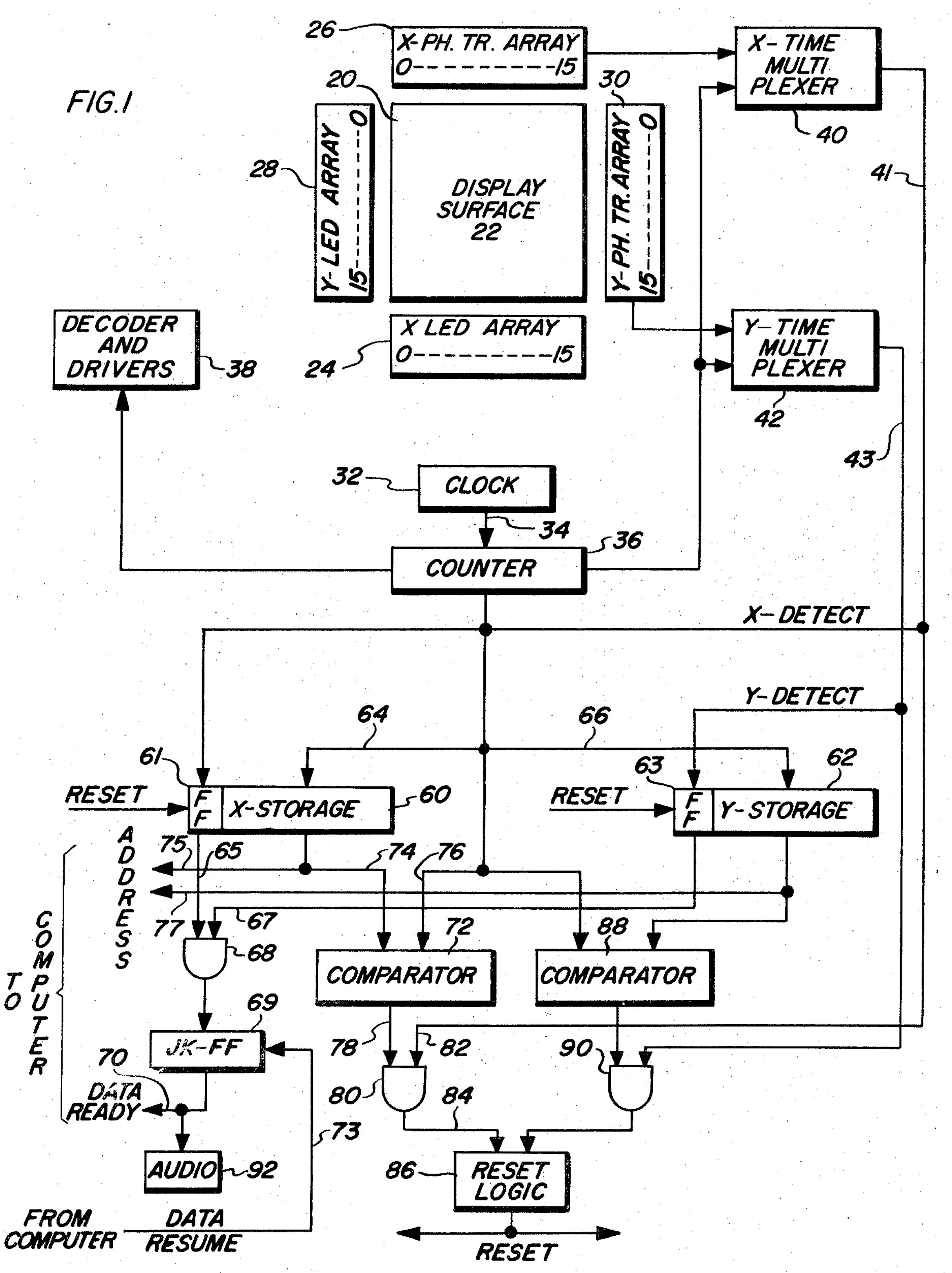
FIG. 1 illustrates an improved *x–y* position encoder in accordance with the principles of the present invention.

Referring now to FIG. 1, there is illustrated a display device 20 having a display surface 22. An *x* array of 16 non-visible radiation sources such as infrared light emitting diodes 24 are mounted along one side of the display device and are paired with a corresponding *x* array of non-visible light detectors such as photoconductive transistors 26 suitably mounted on the opposite side of the display device 22.

A similar *y* array of paired infrared sources 28 and detectors 30 are mounted along the remaining two opposite sides of the display device as illustrated in FIG. 1. Thus, 32 pairs (16 per *x* and *y* axis) are mounted around the perimeter of display panel 20. Standard mounting techniques are utilized for insuring that the paired source/detector array is shielded for maximum noise protection from possible ambient sources of infrared emission near the display panel.

Since the use of light sources which emit in the visible part of the spectrum is undesirable from both a human viewer standpoint and because of ambient light noise problems, gallium arsenide LED's (light emitting diodes, emitting at 900 nm) and infrared phototransistors are used as the source/detector pairs. Other types of non-visible radiation or light sources may also be utilized as advantageously as the infrared sources described herein to illustrate the invention. Alternatively visible light sources may be utilized but not as advantageously as the non-visible sources.

Figure 2:
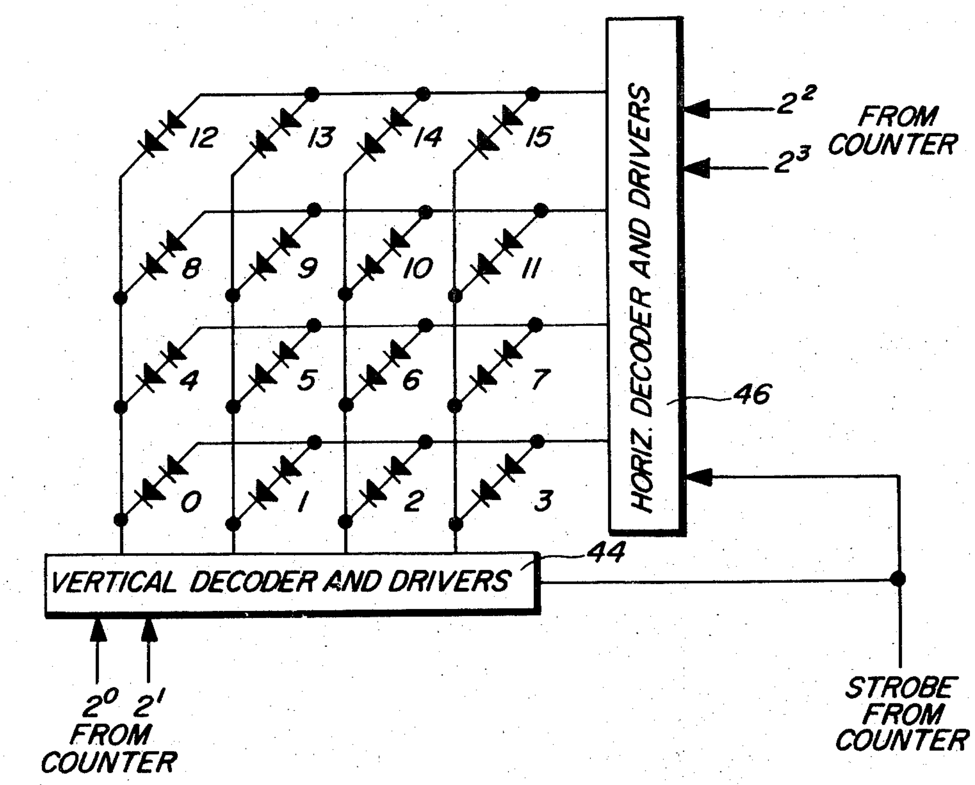
FIG. 2 illustrates the preferred embodiment of a diode matrix array with associated drivers combined such that only eight drivers are requried for a 16 × 16 touch encoder array.
Figure 3:
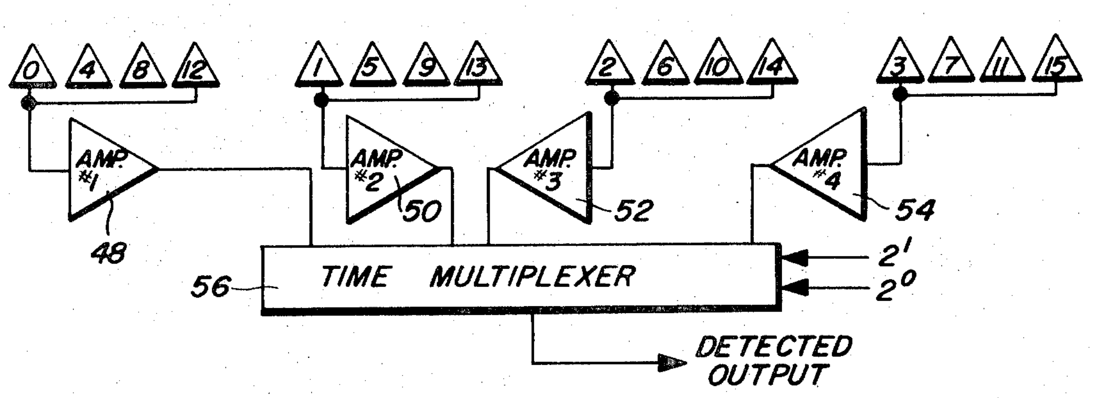
FIG. 3 illustrates the preferred embodiment of a time multiplexed detector circuit requiring only eight detector amplifiers for the illustrated 16 × 16 touch encoder array.

It is to be understood that whereas FIGS. 1–3 illustrate one embodiment of the invention as an *x–y* position encoder for display devices, the present invention can also be utilized as a position or address encoder for other devices or as a position encoder input per se to a computer — with or without other devices. As an example, three dimensional $x$, $y$ and $z$ arrays of paired sources and detectors could be arranged to supply three dimensional position or address information.

As described in the aforementioned application and with reference to FIG. 1 herein there is illustrated an x–y position encoder for supplying the position or address of an interrupted beam in the form of a digital signal for computer input. This combination of sources and detectors can be used to detect the presence and position of a passive stylus, that is, the finger when it is placed into the plane of the array. The passive stylus will block a sufficient amount of light from the infrared source so that the signal output of the associated light detector (the detector directly opposite its source) will be decreased by an electronically detectable amount. When a blocked light beam is electronically detected, this beam position in the array is converted into a digital signal which identifies the address or position of the interrupted beam to the digital system being used with this encoder. The touch encoder array of FIG. 1 provides a grid of 256 addressed positions which can be detected.

The infrared light beams are sequentially scanned across the display surface 22 with an "effective" beam diameter of approximately one-sixteenth inch. Although it is obvious that the technique can be extended to higher resolution grids, the particular application described here did not require a resolution greater than two positions per inch.

A constructed embodiment of the present invention was utilized in connection with a plasma display and memory device similar to that shown in D.L. Bitzer, et al. U.S. Pat. No. 3,559,190 for incorporation as a display device at each terminal in the multiterminal computer based information system of D.L. Bitzer U.S. Pat. No. 3,405,457. On this plasma display, it is desired that the 8 ½ × 8 ½ inches square display surface be divided into 256 areas (a 16 × 16 matrix) which are sensitive to the selection and/or touch of the human finger. That is, the position or address of the area which is selected by pointing or touching of the human finger is automatically sent back to the central computer system in a manner similar to that used to send back key set information. The present infrared position encoder combines very effectively with the plasma display panel because the display surface can also function as a rear projection screen for projecting additional information onto the display surface.

While the present embodiment of the present invention is herein described in respect to its application to a plasma display and memory unit, it is to be understood that the application thereof is not so limited and can as well be applied to other types of display devices, such as cathode ray tubes, solid state displays, etc.

As in the system described in the aforementioned Ebeling, et al. application, the need for optical collimation is eliminated in the present system by activating only one source/detector pair at a time in the $x$ and $y$ arrays. Since the LED's and phototransistors exhibit rise and fall times of 2–5 microseconds, large numbers of source/detector pairs can be scanned within time intervals which correspond to human finger reaction times. For example, if each source/detector pair is turned on for 20 microseconds, then a source/detector array of 100 pairs could be scanned in 2 milliseconds.

The circuit blocks used to perform the scanning, sensing and control functions of a 16 element $x$ and $y$ array in the improved system of the present invention are shown schematically in FIGS. 1–3. The logic units used were of standard TTL type.

In general, the scanning, sensing and control functions are accomplished by electronically scanning the $x$ and $y$ arrays sequentially while keeping a record of the particular $x$ and $y$ address of the selectively activated source/detector pair in each array. The display surfaces are scanned from top to bottom and from left to right as shown in FIG. 1. As in the system of the aforementioned application, upon interruption of the light beams, the particular $x$ and $y$ address of the source/detector pairs in the $x$ and $y$ arrays are noted and transferred to the computer. However, in accordance with the principles of the present invention in the preferred embodiment, the address of the initially detected interrupted beams once transmitted to the computer are thereafter no longer transmitted as long as the interrupted beam status at the old address remains the same. This system repeatedly checks the beam status at the old address of initially interrupted beams and resets the system when the interrupted beam status at the old address has changed. This effectively reduces the amount of information required to be sent to the computer and therefore reduces the required bandwidth of the interconnecting communication facility between the display terminals and the computer. The apparatus providing such functions and operations are shown in FIGS. 1–3. In particular, a free running clock 32 operates through line 34 to operate the four bit counter 36 so as to sequentially select the address designations for each of the 16 source/detector pairs in the $x$ and $y$ arrays through the decoder and drivers 38 for the LED's and through the time multiplexers 40, 42 for the phototransistor detectors.

Referring now to FIG. 2, there is illustrated the preferred arrangement for driving the light beam sources. Since there is an $x$ and $y$ linear array of light emitting sources which are scanned simultaneously, and since the sources can be arranged in a diode matrix to provide for decoding, a preferred arrangement is shown in FIG. 2 for a 4 × 4 diode matrix array. It may be noted that the 32 separate light sources, in this case, light emitting diodes, are placed in pairs such that only eight drivers are required. The numerals in FIG. 2 placed adjacent each pair of diodes represent the particular diode in the $x$ and $y$ linear array. For instance, the numeral 12 adjacent the pair of diodes in the upper left hand corner of FIG. 2 represents diode number 12 in the $x$ array and diode number 12 in the $y$ array. Therefore it can be seen that during sequential scanning, the beam associated with diode 12 along the $x$ axis will always be present simultaneously with the beam from diode 12 along the $y$ axis. The vertical decoder and drivers 44 and the horizontal decoder and drivers 46 each are coupled to the four bit counter 36. This preferred arrangement of FIG. 2 therefore only requires eight drivers rather than 32 drivers for a 16 × 16 touch encoder array.

Referring now to FIG. 3, there is illustrated the preferred detector circuit arrangement which matches the preferred matrix drive scheme illustrated in FIG. 2. In the detector arrangement shown in FIG. 3, in the case of a touch encoder matrix array of 16 × 16, four detectors (photodetectors) share a single amplifier. The output of the four amplifier circuits are time multiplexed from the counter in synchronism with the light emitting diode drive circuits so that only one amplifier circuit is actuated at any particular time. The only physical restriction is that the light from a selected light emitting diode should not be visible to a detector four units away from the selected detector. This characteristic has been shown to be easily realized in practice. Thus, as shown in FIG. 3, phototransistor detectors 0, 4, 8 and 12 each share a detector amplifier 48. Similarly, phototransistor detectors 1, 5, 9 and 13 also share a common detector amplifier 50. It is understood of course that FIG. 3 illustrates the detector scheme for either the *x* or the *y* array, the arrangement in either case being the same. The outputs of the four detector amplifiers 48–54 shown in FIG. 3 are coupled into time multiplexer 56 which in response to the counter 36 selects in a serial manner the output of one of the four detector amplifiers.

To insure that the respective corresponding detectors are receiving only the infrared light beam from the paired source, activation of the respective *x* and *y* detectors can be delayed for a short time by standard delay circuits interposed between counter 36 and the multiplexers 40, 42. This delay time can correspond to the normal activation time for the infrared sources and detectors so as to insure that they are fully turned on, and normally amounts to 10 microseconds.

The basic operation of the system illustrated in FIG. 1 is to sequentially activate pairs of sources/detectors on both the *x* and *y* axis. When a broken beam is detected, the address or position is stored in a storage unit such as a register. When both *x* and *y* beams have been broken, the addresses are transmitted to the computer. Scanning continues, and on the next scan of the old address at which an interrupted beam had been noted, the status of the old address is checked. If the status is the same, i.e., the obstacle, such as a finger, has not moved, scanning continues without again sending the old address to the computer. If on subsequent scans of the old address, the status has changed, i.e., the obstacle has been moved, then the system is reset and the storage units readied to accept new addresses of detected interrupted beams. In a constructed embodiment of the invention operating with a communication facility of limited bandwidth, a pause of 200 milliseconds was provided after resetting prior to the initiation of the search for new interrupted beam inputs. It is understood that the above old address status checks are carried out between the clock pulses to the counter 36. Thus, in the preferred embodiment of the invention, the system continuously scans the display area; when interrupted beams are detected, the address is sent to the computer only initially, and the system resets after the finger has changed position, enabling the system to search for further interrupted beams. The wasteful transmission of redundant information is therefore avoided. If desired, a variety of interface schemes are available such as continuous scanning and furnishing of the interrupted beams address information with each scan rather than only initially, however the transmitting of such redundant information is usually undesirable.

The apparatus providing such operations are illustrated in FIG. 1. The output of counter 36 in addition to driving the decoder and LED drivers 38 and time multiplexers 40, 42 is also coupled to an *x* storage unit 60 and a *y* storage unit 62. The *x* and *y* storage units may comprise for instance registers, and specifically, 4 bit registers for the illustrated 16 × 16 touch encoder array. If an interrupted beam is detected along either the *x* or *y* axis, the detected output (X-detect or Y-detect) is coupled to the respective flip-flop 61, 63 at storage unit 60, 62 to enable the associated addresses for the interrupted beams to be coupled from the counter via 64, 66 and stored in the respective storage unit.

When both the *x* and *y* beams have been interrupted, both inputs on lines 65 and 67 are present to enable And gate 68, thereby triggering the JK-flip-flop 69 and transmitting a Data Ready signal to the computer on line 70. The interrupted beam position addresses are then coupled to the computer from the storage units on lines 75, 77.

Upon completion of the transfer of the addresses to the computer, a Data Resume signal is transmitted on line 73 from the computer to reset the JK flip-flop 69. It is understood that the JK flip-flop is edge triggered, thereby inhibiting the transfer of any redundant address information to the computer. Since the storage units or registers 60, 62 are set by flip-flop 61, 63 at the old address of the detected interrupted beams, means are provided for continuously sequentially activating paired sources/detectors to continuously scan, and thereby check the beam status on each subsequent scan at the old address.

A comparator 72 has one input 74 which couples the *x* address of the interrupted beam from the storage unit 60. The output of counter 36 is also coupled to comparator 72 on line 76. If the addresses on inputs 74 and 76 are the same, a binary 1 is presented on the comparator output line 78; whereas if the input addresses are different, the comparator output on line 78 is a binary 0. The output of the comparator is coupled to one input of an And gate 80, the remaining input of the And gate on line 82 being coupled to the resultant output of the *x* phototransistor array 26. The logic circuits of the system illustrated in FIG. 1 are arranged such that if the beam is uninterrupted, there is a binary 1 on the "*x*-detect" line coupled to line 82; whereas if a beam is interrupted, then there is a binary 0 presented at the *x*-detect line coupled to 82. When a binary 1 is presented at both inputs 78 and 82 of And gate 80, an output 1 is presented on input 84 to reset logic circuits 86. The reset signal clears the storage units, resets flip-flop 61 and 63, and prepares the storage units for loading with new addresses of interrupted beams. A similar comparator 88 and And gate 90 with associated input and output lines for the *y* array are provided in a similar manner as described in connection with like apparatus for the *x* array.

The address information is used by the computer for various purposes which are beyond the scope of the present application. In general, some form of feed back information from the computer would be coupled to the display. Audio information could also be provided if desired, for instance, to assure the user that a touch operation has been noted by the encoder. As an example audio unit 92 provides an audible signal to the encoder operator to indicate beam interruption, detection and address transmission to the computer.

It is understood that the present application has been described in connection with a sequentially scanned crossed light beam system. The improved apparatus of the present invention can, in addition, be used in connection with other types of position encoding devices such as listed in the aforementioned application. Furthermore, the present invention can also be utilized advantageously in a position encoder having only a single array of paired sources and detectors or wherein several separate arrays of respective paired sources and detectors are employed as, for instance, a three-dimensional position encoder.

The foregoing detailed description has been given for clearness of understanding only, and no unnecessary limitations should be understood therefrom, as modifications will be obvious to those skilled in the art.

What is claimed is:

1. In a communication system including a display device, a crossed light beam position encoder for said display device having means for detecting and transmitting the address of interrupted light beams, the improvement comprising:

- a plurality of respectively paired light beam sources and detectors;
- means for sequentially activating said respective pairs of sources and detectors to scan said display device with respective crossed light beams between said sequentially activated paired sources and detectors;
- means for electrically detecting the subsequent status of an initially detected interrupted beam at an associated address; and
- means for inhibiting subsequent transfer of the address of said initially detected interrupted beam in the event the subsequent status at said address has not changed.

2. In a position address encoder for display devices, including a plurality of paired non-visible radiation sources and detectors along respective sides of the display device, means for sequentially activating pairs of said sources and detectors to scan the surface of the display device with respective crossing beams between said sequentially activated paired sources and detectors, and address means for responding to an interruption of said crossing beams to provide the address of the position of said interruption, the improvement comprising:

- means for continuously sequentially activating pairs of said sources and detectors to continuously scan the surface of said display device with said respective crossing beams;
- storage means for storing the address of the position corresponding to the detection of an interrupted beam; and
- means coupled to said storage means, including means responsive to the initial detection of an interrupted beam at an associated address and to the subsequent absence of said interrupted beam at said address on a subsequent scan to reset said storage means.

3. An *x–y* position address encoder for display devices comprising:

- a plurality of paired *x* non-visible light sources and detectors arranged to provide non-visible light beams along the *x* coordinate direction adjacent the surface of said display device;
- a plurality of paired *y* non-visible light sources and detectors arranged to provide non-visible light beams along the *y* coordinate direction adjacent the surface of said display device;
- sequential timing control means selectively coupled to said plurality of *x* and *y* non-visible light sources and detectors for sequentially activating corresponding pairs of *x* sources and detectors, while sequentially activating corresponding pairs of *y* sources and detectors;
- said *x* and *y* sources when sequentially activated providing intersecting non-visible light beams sequentially scanning the surface of said display device;
- said sequential timing control means including an *x* and *y* address counter, including means for denoting the *x* and *y* address of the particular pairs of *x* and *y* sources and detectors when sequentially activated;
- means coupled to said *x* and *y* address counter and including means responsive to an interruption of said intersecting non-visible light beams for identifying the corresponding *x* and *y* position addresses;
- storage means for storing said identified *x* and *y* position addresses corresponding to an interruption of said intersecting non-visible light beams; and
- means coupled to said storage means, including reset means responsive to the initial detection of an interrupted beam at an associated address and to the subsequent absence of said interrupted beam at said address on a subsequent scan to reset said storage means.

4. An *x–y* position encoder for display devices according to claim 3, wherein said reset means includes means coupled to said storage means and to said detectors for comparing an initial detected and stored interrupted beam status at one address with the detected status on subsequent scans of said address.

5. An *x–y* position encoder for display devices according to claim 3, wherein said reset means includes;

- comparator means having one input coupled to said storage means and another input coupled to said counter for comparing the address of a detected interrupted beam with the sequential addresses from said counter and providing an output signal when said addresses are the same.

6. An *x–y* position encoder for display devices according to claim 5, wherein said reset means further includes X and Y And gates having inputs coupled respectively to said comparator means and to said X and Y detectors; said And gates providing a reset signal to reset said storage means when said comparator means output signal and a detected beam signal from said detectors are present at said And gate.

7. In a communication system including a display device, a light beam position encoder for said display device having means for detecting and transmitting the address of interrupted light beams, the improvement comprising:

- a plurality of respectively paired light beam sources and detectors;
- means for sequentially activating said respective pairs of sources and detectors to scan said display device with respective crossed light beams between said sequentially activated paired sources and detectors;
- means for electrically detecting the subsequent status of an initially detected interrupted beam at an associated address; and
- means for inhibiting subsequent transfer of the address of said initially detected interrupted beam in the event the subsequent status at said address has not changed.

8. In a light beam position address encoder for display devices, including a plurality of paired non-visible radiation sources and detectors along at least one side of the display device, means for sequentially activating pairs of said sources and detectors to scan the surface of the display device with a light beam between said sequentially activated paired sources and detectors, and address means for responding to an interruption of said light beam to provide the address of the position of said interruption, the improvement comprising:

means for continuously sequentially activating pairs of said sources and detectors to continuously scan the surface of said display device with said light beam;

storage means for storing the address of the position corresponding to the detection of an interrupted beam; and means coupled to said storage means, including means responsive to the initial detection of an interrupted beam at an associated address and to the subsequent absence of said interrupted beam at said address on a subsequent scan to reset said storage means.

9. In light beam position encoder apparatus having means for detecting and transmitting the address of interrupted light beams, the improvement comprising:

a plurality of respectively paired light beam sources and detectors;

means for sequentially activating said respective pairs of sources and detectors to provide respective crossed light beams between said activated paired sources and detectors;

means for electrically detecting the subsequent status of an initially detected interrupted beam at an associated address; and means for inhibiting subsequent transfer of the address of said initially detected interrupted beam in the event the subsequent status at said address has not changed.

* * * * *